United States Patent
Zhang et al.

(10) Patent No.: US 8,462,224 B2
(45) Date of Patent: Jun. 11, 2013

(54) IMAGE RETRIEVAL

(75) Inventors: Tong Zhang, San Jose, CA (US); Peng Wu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 12/878,782

(22) Filed: Sep. 9, 2010

(65) Prior Publication Data

US 2011/0292232 A1 Dec. 1, 2011

Related U.S. Application Data

(60) Provisional application No. 61/350,469, filed on Jun. 1, 2010.

(51) Int. Cl.
 *H04N 5/228* (2006.01)
(52) U.S. Cl.
 USPC .......................................................... 348/222.1
(58) Field of Classification Search
 USPC .......................................................... 348/222.1
 See application file for complete search history.

(56) References Cited

U.S. PATENT DOCUMENTS

| | | | |
|---|---|---|---|
| 8,180,112 B2 * | 5/2012 | Kurtz et al. | 382/108 |
| 2006/0253491 A1 * | 11/2006 | Gokturk et al. | 707/104.1 |
| 2009/0196510 A1 * | 8/2009 | Gokturk et al. | 382/224 |
| 2009/0234842 A1 * | 9/2009 | Luo et al. | 707/5 |
| 2011/0085710 A1 * | 4/2011 | Perlmutter et al. | 382/118 |

* cited by examiner

*Primary Examiner* — James Hannett

(57) ABSTRACT

A method, comprising receiving query data including an image of a person, and detecting a face of the person in the image to create a detected face, generating face data and clothing data using the detected face including a measure of characteristics of the face and clothing of the person, and retrieving images and video for the person and a related group of people by comparing the face data and clothing data of the person with multiple measures for the characteristics of faces and clothing generated from a set of images and video in which other people appear wherein co-appearances of the person with at least some of the other people are used to retrieve content in which the person and people from the related group appear.

13 Claims, 7 Drawing Sheets

IMAGE RETRIEVAL

CLAIM FOR PRIORITY

The present application claims the benefit of priority to U.S. Provisional Application Ser. No. 61/350,469, filed on Jun. 1, 2010, the disclosure of which is hereby incorporated by reference in its entirety.

BACKGROUND

A person may capture images or video content when visiting an attraction, such as a theme park for example. However, capturing quality content in such a setting can sometimes be challenging. For example, the person in question may not be in all the captured content by virtue of the fact that they are 'behind the camera'—that is to say they are the person capturing the images or video. This can make it difficult for the person to appear in any content unless they are happy to ask someone else to capture an image for example, which may result in a substandard result, especially if the person asked does not know how to properly operate the camera equipment. Furthermore, the necessity to carry and use such image capture equipment can be tiresome for a user, or it may simply be the case that the person has forgotten to bring camera equipment with them. It is also possible that some of the most desirable images or video may be impossible for a person to capture. For example, on certain attractions in a theme park the person may not be able to capture content while they are on the attraction due to safety or practicality issues.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
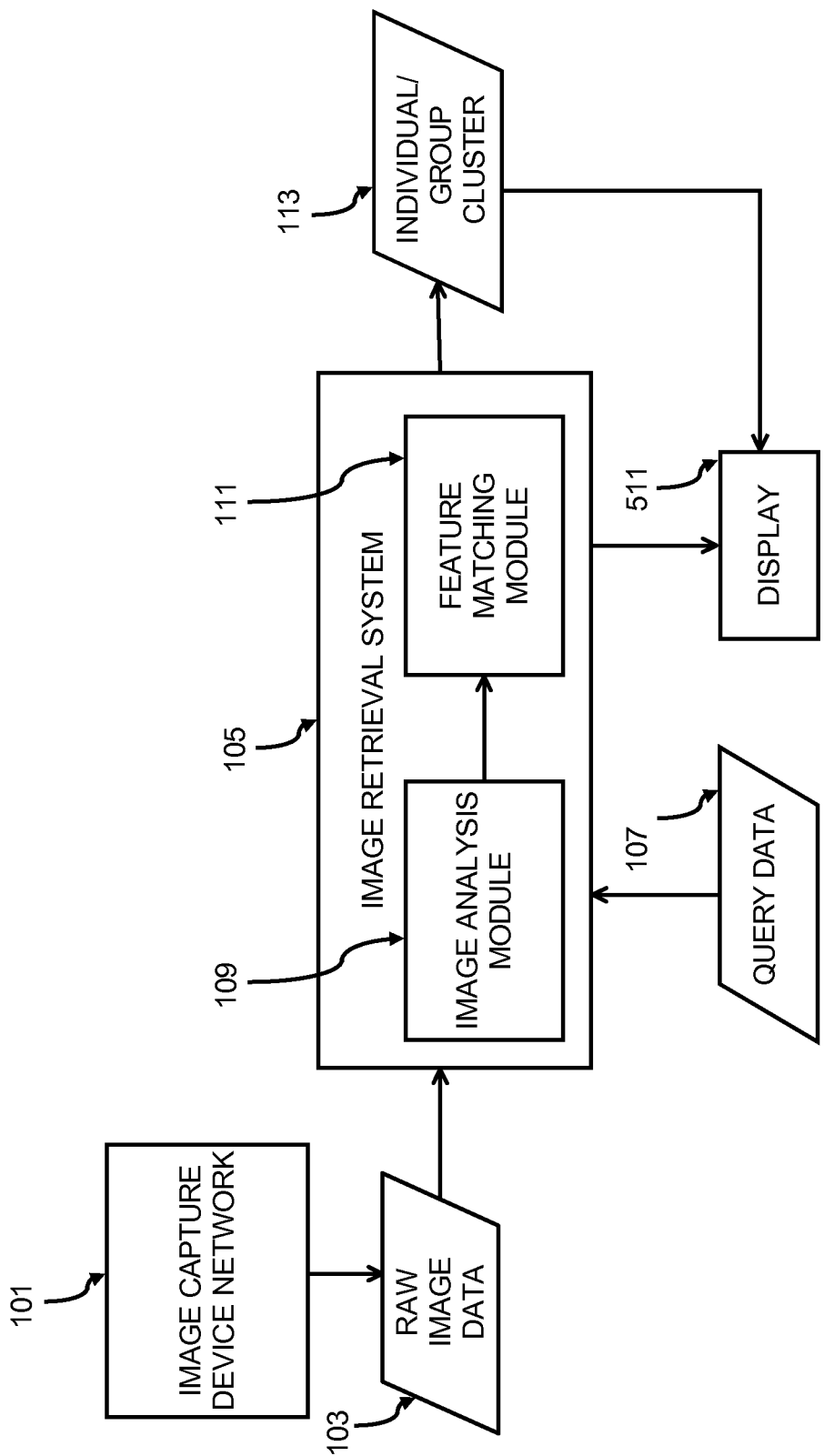
FIG. 1 is a functional block diagram of an overview of an image retrieval system according to an example.

Reference will now be made in detail to certain implementations, examples of which are illustrated in the accompanying drawings. In the following description, numerous specific details are set forth in order to provide a thorough understanding of the implementations. Well-known methods, procedures, components, circuits, and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first item could be termed a second item, and, similarly, a second item could be termed a first item.

The terminology used in the description herein is for the purpose of describing particular implementations only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Currently in theme parks, at events or at other such attractions where people engage in social activities in a group, there are employees or contractors who take pictures of visitors at certain predetermined locations or areas. Since there are generally only a small number of people doing this, the areas covered and the revenue generated from corresponding image sales can be limited. Fixed cameras that automatically take pictures in certain locations—either at fixed intervals, continuously (in the case of a video camera for example) or a combination of the two—can also be present. Visitors either have to manually search for their images (such as when they leave a park or event for example), or otherwise engage with a third party in order to secure copies of images taken of them and any group they may have been a part of.

By installing cameras at various locations of a park or event (or otherwise using an existing infrastructure of image capture devices), vast numbers of images and video streams can be automatically captured. Such rich photo/video content can be unique and have special value to visitors such as images/videos taken during a ride, or images of all members of a group for example. If related content can also be retrieved for a guest group later, it will greatly enrich their memories of a visit or event.

Accordingly, there is provided an apparatus and method which provides a mechanism for a person and any associated group to retrieve images and videos which have been captured of them within a predetermined area such as in an attraction or other location or event, or other regions where guests/visitors/delegates etc. are allowed to roam for example. Through the use of co-appearance analysis to find images/videos of a whole group of people, and by using face/clothes clustering to find more images/videos of people from a few initial matches, content can be retrieved which would otherwise have been unavailable. According to an example, automated human/group retrieval is used in order to provide convenient and accurate retrieval of captured content. According to an example, co-appearance analysis includes analysing captured images and video in order to determine images and video in which members of group of people appear, either in isolation, or in conjunction with others (who may or may not be members of the group). For example, given a set of captured images in which a first person from a group of people appears in a sub-set of the images, co-appearances with other detected people in the sub-set of images are used in order to determine other images within the set in which members of the group appear. Accordingly, images in the set in which a person other than the first person appears can be retrieved even though they would otherwise have remained unselected if the co-appearance had not been detected. According to an example, a person can be said to co-appear with another person if they appear together in images a predetermined number of times, or if they appear together in a portion of video for at least a predetermined period of time. A group of people which co-appear in this way form a related, or associated, group. This can be a group of family members, a group of friends or colleagues, or any other group of people who consistently appear together in the set of images and video.

FIG. 1 is a schematic block diagram of an overview of a system for processing, selecting and retrieving image data. In a desired area, such as certain predetermined locations in a theme park or at an event for example, a network of image capture devices 101 is deployed. Such devices can be still or video capture devices, or devices which capture a combination of still and video image data. Captured data forms a set of images and video from which certain ones of the images and video can be selected and retrieved by the system in response to user input, or otherwise automatically in response to a query. Although at nominally fixed locations, a field of view of some or all of the devices can be altered if desired, either manually, automatically, directly at the device or remotely. The devices generate raw image data 103 (still and/or video) representing digital images and video captured within the fields of view of the devices. Captured video footage is represented by one or more representative still image frames of the video. The raw image data is input to an image retrieval system 105 which includes an image analysis module 109 and feature matching module 111. The image analysis module 109 takes the raw image data as input and generates a set of representative image frames for video. Alternatively, all frames from a portion of video footage can be used as representative image frames. The image analysis module 109 sorts images (both captured as still images, and those including representative image frames) by capture location and time of capture. For example, images can be grouped according to capture location and then sorted within a group by time of capture, with newer images appearing higher up in a listing than older images for example. Providing the capture time and capture location of images and video enables a search space to be reduced—that is to say, only images/video captured within a specific time frame and/or location or set of locations along a specific route need be selected or retrieved according to an example.

Images with higher quality (such as those which have a resolution suitable for printing for example, or which have an exposure within desired parameters so that an image or video frame is neither under or over exposed or blurry for example) can be selected in module 109, with other images discarded if required. Face detection is performed in the image analysis module 109 to detect faces in the images (note that images may be down-sampled before applying face detection for improved speed of processing), and any clothing regions for people identified in the images are identified. A detector of humans can be integrated into the image analysis module 109 so that images which are devoid of people are not processed, thereby saving computational expense.

Query data 107 is provided as input to the image retrieval system 105. The data 107 is image data representing an image of a person who wants to retrieve a set of images and/or video of themselves and/or the group that they are with, and who is a user of the system 105. The set to be retrieved can include images and video in which the person appears with other people who may or may not be part of a group that the person was with when the raw image data was captured. The query data can be generated from a portion of video of the person. Accordingly, representative frames in which the person is visible or otherwise identifiable are extracted from the portion using any one of a number of common techniques (similarly to the extraction of representative, or key, frames in the raw image data). Such processes typically include setting representative images/frames as those at the time of a change of scenes in the video, images including each person appearing in the video, images including a specific shape, and/or images having a high appearance frequency. Alternatively, all frames of the portion may be used as representative frames instead of using a part of the frames as representative frames. The query data is processed in order to detect the face of the person making the query to create a detected face. From this, characteristics representing the face of the person and their clothing are determined, and input to the feature matching module 111.

The feature matching module 111 uses the detected face and the characteristics of the person making a query to build a cluster of images and/or video 113 from the raw image data in which that person appears. The accuracy and size of the cluster can be adjusted using several parameters relating to capture time and/or location for the images, and by reference to co-appearances of the person with other individuals. According to an example, feature matching module 111 takes the query data as input and uses this to perform a comparison of user features and characteristics against content from the raw image data 103 in order to retrieve images and/or video in which the user appears. Typically, raw image data 103 is preprocessed in image analysis module 109 in order to identify content in which at least one person is present and also to screen out content which has a quality measure below a predetermined threshold and which may prevent that content from being successfully preprocessed and/or printed. For example, a user will be unlikely to want to retrieve content in which they appear blurred, or in which an exposure is not optimal, and accordingly such content is discarded from further processing which can reduce processing load and storage space if that content is not stored. Preprocessing further includes identifying faces in images and video from the raw image data 103 and using the identified faces to determine facial and clothing characteristics for any identified people against which the comparison is performed.

Figure 2:
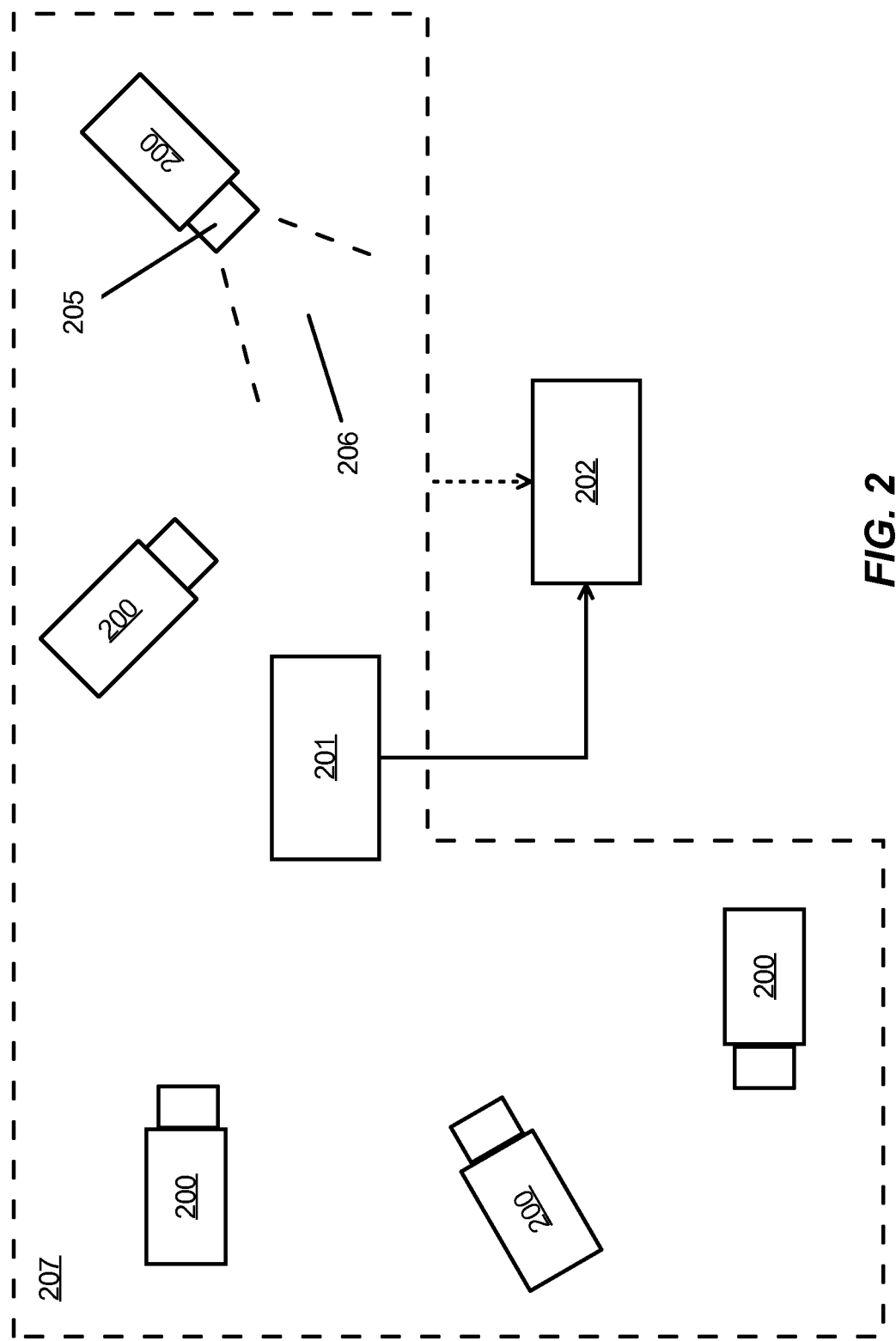
FIG. 2 is a schematic representation of a network of digital image capture devices according to an example.

FIG. 2 is a schematic representation of a network of digital image capture devices 200 which are distributed over a geographic area 207, and linked to a storage and processing system 202. Devices 200 generate raw image data 103 representative of still and/or video images within their respective fields of view. The devices 200 can capture image and video data continuously or in response to the presence of a person. For example, some of the devices 200 can be provided with sensors, such as passive IR sensors for example, which are triggered when someone enters a field of view of the sensor. Triggering the sensor can cause the device to capture content in the form of images and/or video such as continuously for a predetermined time after the sensor has been triggered for example. Alternatively, devices 200 can be triggered to capture content in response to a control signal from a monitoring station to which the devices are connected, or in response to a signal received from a device on the person of those within the vicinity of the devices. For example, visitors to a park can be issued with devices which can be worn or carried and which emit a beacon within a predefined radius which can be picked up by a receiver of one or more devices 200. Upon reception of such a beacon signal, a device can be triggered to capture content until the signal is no longer received (e.g. out of range), or for a predetermined amount of time.

Devices 200 can be networked together (not shown), and/or networked to a routing system 201 for transmission of the raw image data 103 to storage and processing system 202. The networking can be a wired or wireless network, or a combination of the two as may be appropriate (for example, some devices 200 can be wirelessly networked into a wired infrastructure so that they can be moved into different locations depending on requirements of or load on the system). Alternatively, devices 200 can be individually connected to system 201 or 202, which connection can be wireless or wired. Routing system 201 can be provided with processing capability in order to preprocess received raw image data. For example, instead of human detection etc. occurring in an image analysis module 109, raw image data from devices 200 can be preprocessed in 201 in order to detect the presence of humans (using either body contour detection or face detection for example). Any images or portions of video devoid of people can be discarded at this stage, or otherwise flagged to indicate the absence of people. Upon receiving raw image data, system 202 can process the image data in order to provide preprocessing actions including image quality screening, face detection, clothes region detection. Alternatively, all preprocessing can be performed prior to reception of the raw image data 103 in system 202 (such as all actions being performed in 201, or in the image capture devices themselves upon or subsequent to capture for example). Further alternatively, all preprocessing can be performed in system 202.

With reference to FIG. 2, a lens 205 of a device 200 has a field of view depicted generally by 206. Such details are not shown for all devices so as to not unnecessarily obscure the figure, however, it will be appreciated that devices 200 can all have similar, identical or differing fields of view in order to image a desired area of the region 207. A field of view of a device 200 can be altered by allowing some degree of movement around a fixed location—for example, a device can be positioned on a runner or other suitable mechanism which allows the field of view to move through a predefined number of positions. Devices 200 can include a position determining module, such as a GPS module for example, which can communicate the position of the camera in combination with or independently of the image data. Alternatively, the position of a device can be provided manually, particularly if the device is permanently fixed for example. In an example, each device 200 'stamps' data captured with a time and location of capture. The time/location data can be provided in the form of metadata which augments an image or portion of video. A time of capture can be provided using the GPS module, or alternatively using an internal clock of a device.

At the exit of a park, or at any other given location of an event etc, there can be kiosks or other provision for people to retrieve images and videos captured by devices 200. For a group of people who are family members, relatives, friends or colleagues, images and videos of all members of the group may be retrieved at one time. According to an example, one or more group members may present themselves in front of a camera of the kiosk or other collection mechanism in order for one or more images of that person to be captured. These images are input to the system 105 as query data 107, and using this query data images and video of the person in question as well as that of other people that the person is in a group with can be retrieved.

Faces are detected in the query data 107 using any one of a number of commonly used face detection processes. Such processes typically include using a binary pattern-classification method. That is, the content of a given part of an image under consideration is transformed into features, after which a classifier trained using example faces determines if that particular region of the image is a face. A window-sliding technique can be employed with the classifier used to classify the portions of the image at various locations and scales as either faces or non-faces (such as background for example). Detected faces are used to classify clothing regions in an image, and thereby generate clothing signatures for people.

Alternatively, at the exit to a park etc, an image of a person can be captured or generated from a video portion and used to automatically gather images and video if that person and a related group without any other intervention. A user (either the person whose image was captured, or a person from the group) can then retrieve gathered content at their leisure such as using a web based service for example in which the person logs in to view content gathered for and of them. Such a log in can be provided by the park etc, or set up by the user.

Figure 3:
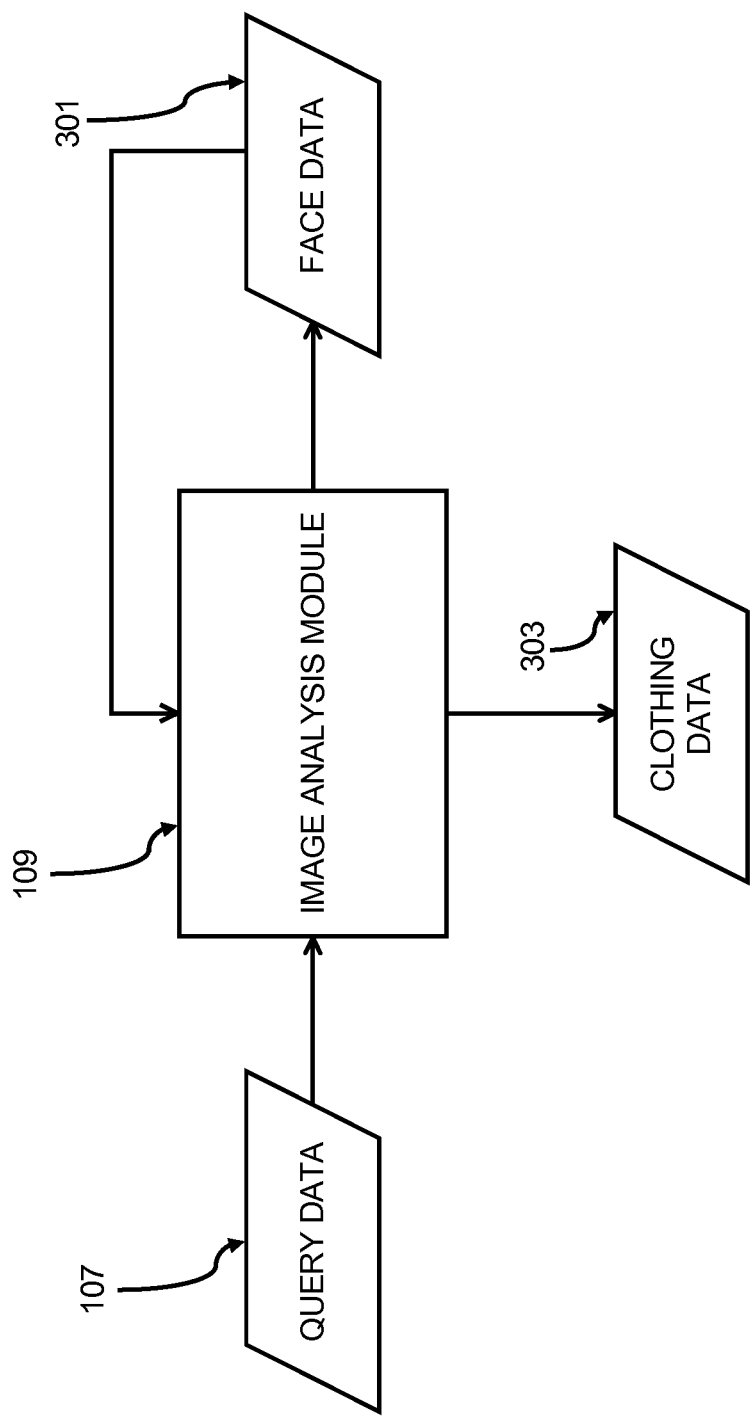
FIG. 3 is a functional block diagram of a process for generating face and clothing data for the system according to an example.

FIG. 3 is a schematic block diagram of an example for generating face and clothing data from query data 107. Query data 107 is input to image analysis module 109. As described above the query data includes one or more images, which are still images captured from a still image capture device, or still image frames from a portion of video (for the sake of clarity, the following description will describe the processes performed on a single image). Image analysis module 109 detects faces in the image in order to generate face data 301. Similarly to corresponding face data determined using the raw image data, the face data 301 includes the detected face, the size and location of the face and can include data representing the size and position (or relative location) of certain characteristics of the face such as the position of the left and right eyes, tip of the nose and centre of the mouth for example.

Face data 301 is used by the image analysis module 109 in order to determine a location for the torso of a person from which clothing data 303 can be generated. According to an example, a set of heuristic ratios are used to determine a clothing region for a person. The size of a detected face of a person in an image is used to normalize a torso region for the person, and to position the torso region. For example, the area of a torso region can be 160% of the area of a detected face region, and positioned directly below it, or at some other suitable offset from the position of the detected face. Other alternatives are possible as will be appreciated. Using the determined torso region, image analysis module 109 generates a clothing signature for a person which represents the colour and/or texture of the clothing identified within the torso region. Generating the signature can be done using a number of common techniques. One such suitable technique includes creating a color histogram for the clothing region corresponding to each face detection.

Face and clothing data 303, 301 generated using the query image(s) are compared with face and clothing data generated from images captured using the image capture devices 200 to search for images in which the querying person appears (either in isolation or with other people). In order to narrow down a search space, the user may select images/videos from within one or more capture time/location pairs of interest. A search can then be performed amongst images/videos taken at particular locations and/or within particular time slots for example. Matching images/video can be displayed to a user as they are discovered, and the users can confirm the faces in the displayed images that have been correctly identified.

According to an example, a user can operate an automated retrieval system using a user-interface to confirm that a retrieved image or video includes the user (or other related person such as a person in a relevant group) or to otherwise reject it. Any confirmed images and video as well as other retrieved images/video can form a cluster of content for that user. Such a cluster can be conveniently displayed to the user as content is retrieved, or once retrieval is complete, and at any stage a user can confirm or reject images and/or video using the user interface. Among the retrieved images/videos in the cluster for the user, co-appearances of further people are detected and analyzed to identify other members which go to make up a group of people, such as a set of family members, friends, or work colleagues for example. If faces that appear together with the user are found in other images, the corresponding images/videos in which the co-appearances occur can be grouped to form a set of retrieved content for any additional identified people co-appearing with the user. Under certain circumstances, the face and/or clothing of the original user providing the query data can be occluded in certain images or video clips in which they appear. In such circumstances, co-appearances of the person with others can be used in order to retrieve that relevant content. For example, the original user can confirm his or her presence in certain ones of images and video in which they have been correctly identified. Characteristics of other people who are also in the confirmed content can then be used to retrieve content for the original querying person which would otherwise have not been retrieved because the face, clothing or both of the person was occluded. In this way, co-appearances are leveraged in order to build a cluster including relevant content.

In order to filter trivial co-appearances, such as co-appearances in which a person simply happens to have been captured in an image or video portion at the same time as the user, the system can require that a co-appearance be disregarded unless there is an occurrence rate for co-appearances greater than a predetermined threshold. For example, if a user appears in some images with another person more than 5 times for example, that occurrence rate can indicate the provision of a non-trivial and consistent co-appearance (such that it would be reasonable to assume that the user knows, or is otherwise part of a group with the other person). In the case of video, the predetermined threshold can include a period of time over which the user appears in a portion of video with the other person. For example, if the user is consistently in the a number of image frames of a video portion with another person for a period of time longer than, for example, 10 seconds, then the co-appearance can be classified as a non-trivial and consistent co-appearance. Any other identified people who appear with a person who has co-appeared with the user can similarly be used to determine co-appearances with other people within a group. For example, a user may co-appear in images with a first person, but not a second person who is also part of the group with the user and the first person. If the first person co-appears with the second person, content of the second person can be retrieved and clustered with content of the user and the first person.

Clusters can be displayed to the users in the order of cluster size (by content amount) for example, or by cluster accuracy. The users can then confirm clusters of group members. With the confirmed clusters, other images and video frames in the search scope can be compared so as to include more images and video of group members. Accordingly, a cluster of images and video frames can be formed for each group member. With these clusters, images of some or all members in the group can be retrieved. According to an example, with one video frame, through both forward and backward face/human tracking in the corresponding video portion or stream, a video clip can be retrieved which may contain audio and video of group members. According to an example, users may be able to perform basic video editing tasks, such as clipping a portion of video to a desired duration and/or selecting transitions between scenes of a portion or portions of video.

Thus, according to an example, retrieved images and video clips are presented to the users through an interactive user interface. The users can order photo/video products such as photo prints, photo/video books, posters and DVDs and so on using the interactive display. Besides retrieving images/videos at a location where the images were captured, the same process may be offered via a web service for example. All the image/video content and generated metadata can be considered as out of date and may be deleted after a fixed number of days (e.g. 10~30 days).

According to an example, certain users may wish to restrict the way in which content in which they appear is distributed. For example, a trivial co-appearance of a person in an image or portion of video could result in that person being retrieved by the system in connection with a certain user with whom they have no affiliation or desire to be affiliated. Accordingly, for a person who does not wish to have content distributed in which they appear (particularly if that content is distributed to other people that they do not know for example), provision can be implemented for removing content in which that person appears from the system. For example, control query data for the person wishing to control content in which they appear can be generated (such as at the entrance of a theme park, or at the beginning of an event) and used to determine any images and/or video in which that person appears in subsequently captured content. Such content can be excluded from retrieval by anyone other than the person in question.

Figure 4:
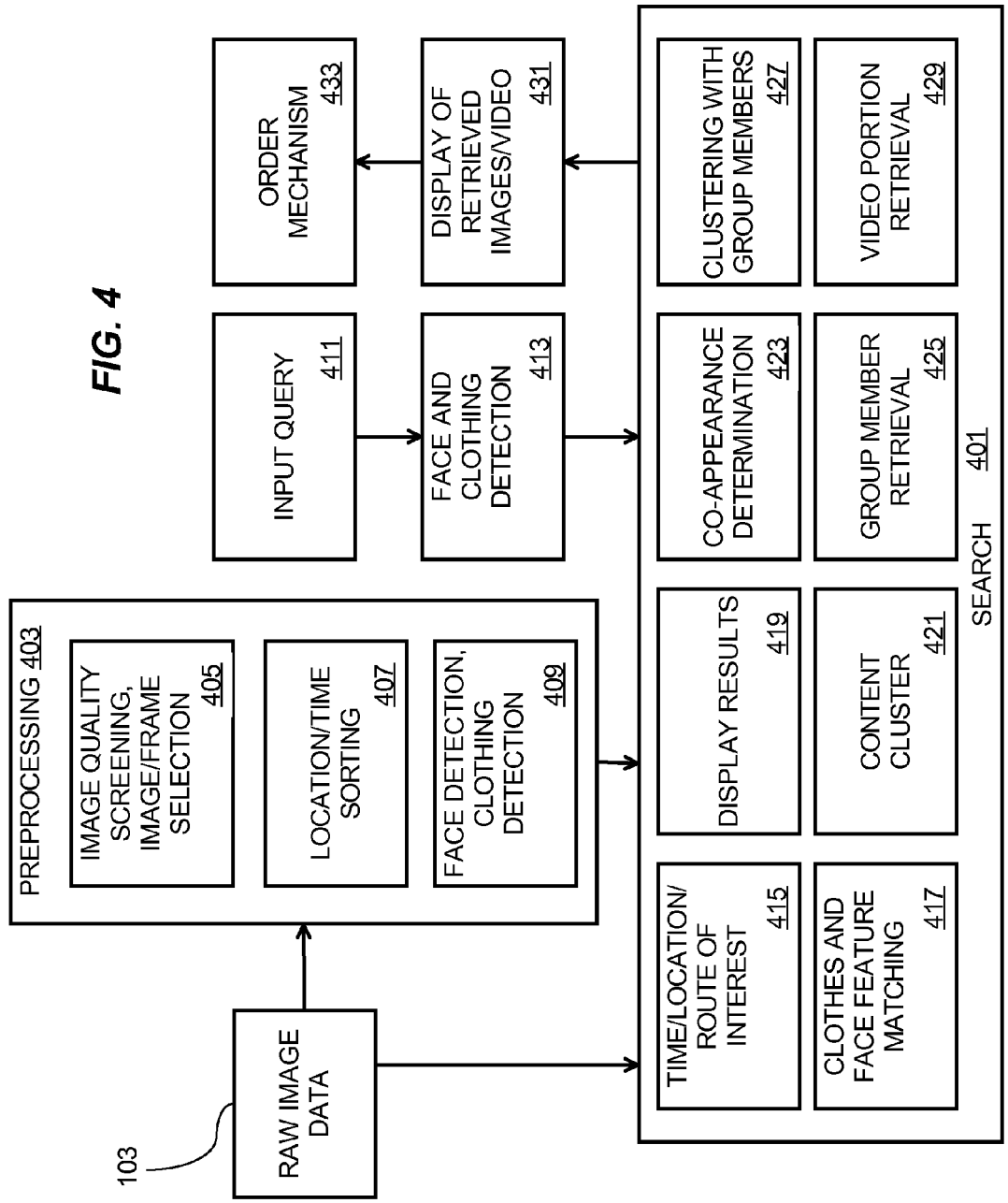
FIG. 4 is a functional block diagram of an image retrieval system according to an example.

FIG. 4 is a schematic block diagram of a process for retrieving images according to an example in which preprocessing of raw image data 103 occurs in an image analysis module 109. Raw image data 103 generated using the image capture devices 200 is input to a preprocessing module 403 and a search module 401. Preprocessing module 403 sorts images from the raw image data 103 by capture time and/or capture location. Images are processed in order to screen out images with lower image quality. For example, images which are not optimally exposed (due to changing weather conditions for example), or which are blurred can be discarded. A determination of image quality can be performed against a predetermined quality metric, with any image having a quality value below the metric being discarded, or otherwise given a lower priority for any further preprocessing. Images are further preprocessed in order to detect faces within images, and to generate a corresponding measure representing a region of clothing in respective images in which one or more people appear so that clothing signatures can be generated.

Formulating an input query 411 according to an example includes capturing an image of one or more members of a group, and performing face and clothing detection 413 using the or each captured image to generate data representing a face and clothing of the or each person as explained above. The face and clothing data is used as a query in a search module 401 in order to generate a cluster of images and/or video clips in which the or each person appears.

In the search module 401, a user can select one or more of sets of time/location and route of interest 415. For example, a user can provide an indication of a route which has been taken by them through a theme park (or a portion of a route in which they are interested), and which can includes an indication of time periods spent in certain locations or at certain attractions and/or the timing at which the user traversed a route or attraction for example. The time/location/route of interest information 415 is used to match clothes and face features 417 in order to retrieve a first set of matching images/frames which were captured along the route or at the location(s) at the time/timings indicated. The results can be displayed 419 to users in the form of a cluster of content 421 for the user, and confirmation that the provided images are accurate can be provided by the user. At this stage, some content can be removed if it is inaccurate. Following a confirmation stage, further images and video frames with matching face and clothing features from the data set can be identified using a refined model of a user's face and clothing based on the confirmation or rejection of certain ones of the images and/or videos. It is also possible to detect other group members from co-appearances in the images 423 such that images/frames of these other group members can be retrieved 425. Further display to a user and confirmation can be solicited at this stage using a group cluster 427 which is a cluster of content including images and video of the user as well as related content in which the user appears with other people who are determined to be part of a group with the user (as opposed to being part of a trivial co-appearance as described above for example).

An interactive display 431 of identified images/video provides a user with the ability to select and confirm the accuracy of images and video clips. Such a display mechanism can be used to enable a user or a group to select and order products or prints of images or video clips derived from the system using an order mechanism 433 such as a simple 'one-click' system for example in which hard copies of images or other items such as those described above can be purchased using either stored payment details of the user, or by soliciting payment at the order stage.

The preprocessing module 403, and search module 401 form part of the image retrieval system 105, which system typically includes one or more discrete data processing components, each of which may be in the form of any one of various commercially available data processing chips. In some examples, the image retrieval system 105 is embedded in the hardware of any one of a wide variety of digital and analog computer devices, including desktop and workstation computers, printers, scanners, and portable electronic devices (e.g., mobile phones, laptop and notebook computers, and personal digital assistants) via which images can be retrieved over a wired or wireless connection to a 202. In some implementations, the image retrieval system 105 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM or other suitable optical media.

Figure 5:
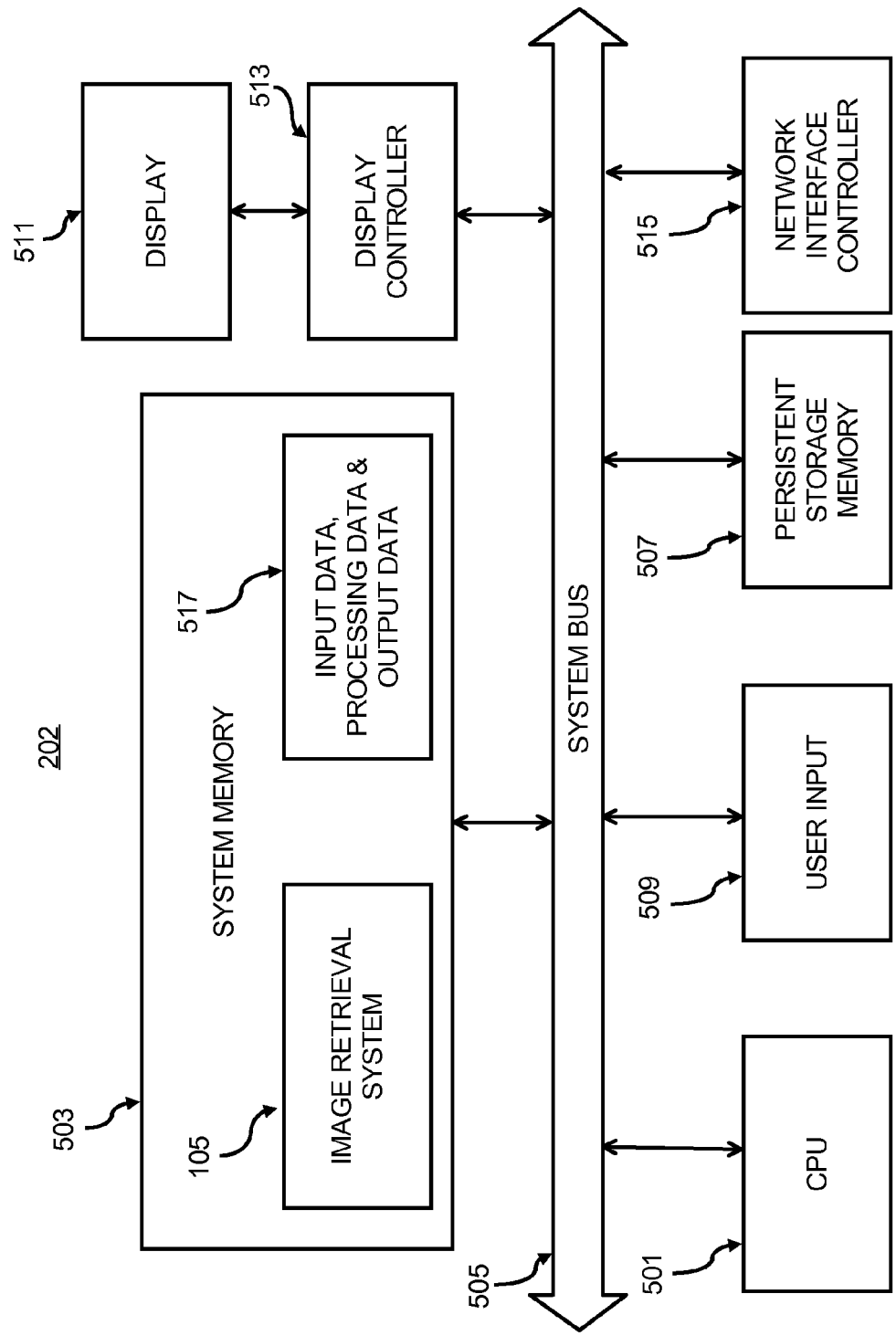
FIG. 5 is a schematic representation of a storage and processing system according to an example.

FIG. 5 is a schematic block diagram of a storage and processing system 202 that can implement any of the examples of the image retrieval system 105 that are described herein. The system 202 includes a processing unit 501 (CPU), a system memory 503, and a system bus 505 that couples processing unit 501 to the various components of the computer system 202. The processing unit 501 typically includes one or more processors, each of which may be in the form of any one of various commercially available processors. The system memory 503 typically includes a read only memory (ROM) that stores a basic input/output system (BIOS) that contains start-up routines for the system 202 and a random access memory (RAM). The system bus 505 may be a memory bus, a peripheral bus or a local bus, and may be compatible with any of a variety of bus protocols, including PCI(e), VESA, Microchannel, ISA, and EISA. The system 202 also includes a persistent storage memory 507 (e.g., a hard drive (HDD), a floppy disk drive, a CD-ROM drive, magnetic tape drives, flash memory devices, and digital video disks) that is connected to the system bus 505 and contains one or more computer-readable media disks that provide non-volatile or persistent storage for data, data structures and computer-executable instructions. According to an example, raw image data 103 as well as preprocessed data is stored in memory 507, with preprocessing occurring in system memory 503 for example.

A user may interact (e.g., enter commands or data) with system 202 using one or more input devices 509 (e.g., a keyboard, a computer mouse, a microphone, joystick, and touch pad or touch sensitive display screen). Information may be presented through a user interface that is displayed to a user on the display 511 (implemented by, e.g., a display monitor which can be touch sensitive, including a capacitive, resistive or inductive touch sensitive surface for example), and which is controlled by a display controller 513 (implemented by, e.g., a video graphics card). The system 202 also typically includes peripheral output devices, such as speakers and a printer. One or more remote computers may be connected to the system 202 through a network interface card (NIC) 515. For example, the system 202 can include provision to send retrieved data to a remote location where certain items are prepared for a user (such as photo books, printed merchandise etc). Alternatively, system 202 can upload retrieved data, or a pointer thereto, to a remote storage service such as cloud based storage service for example such that user is able to retrieve that data at a later date using a web-based portal for example.

As shown in FIG. 5, the system memory 503 also stores image retrieval system 105, and processing information 517 that includes input data, processing data, and output data. In some examples, the image retrieval system 105 interfaces with a graphics driver to present a user interface on the display 511 for managing and controlling the operation of the image retrieval system 105, such as for confirming or rejecting retrieved content for example.

Figure 6:
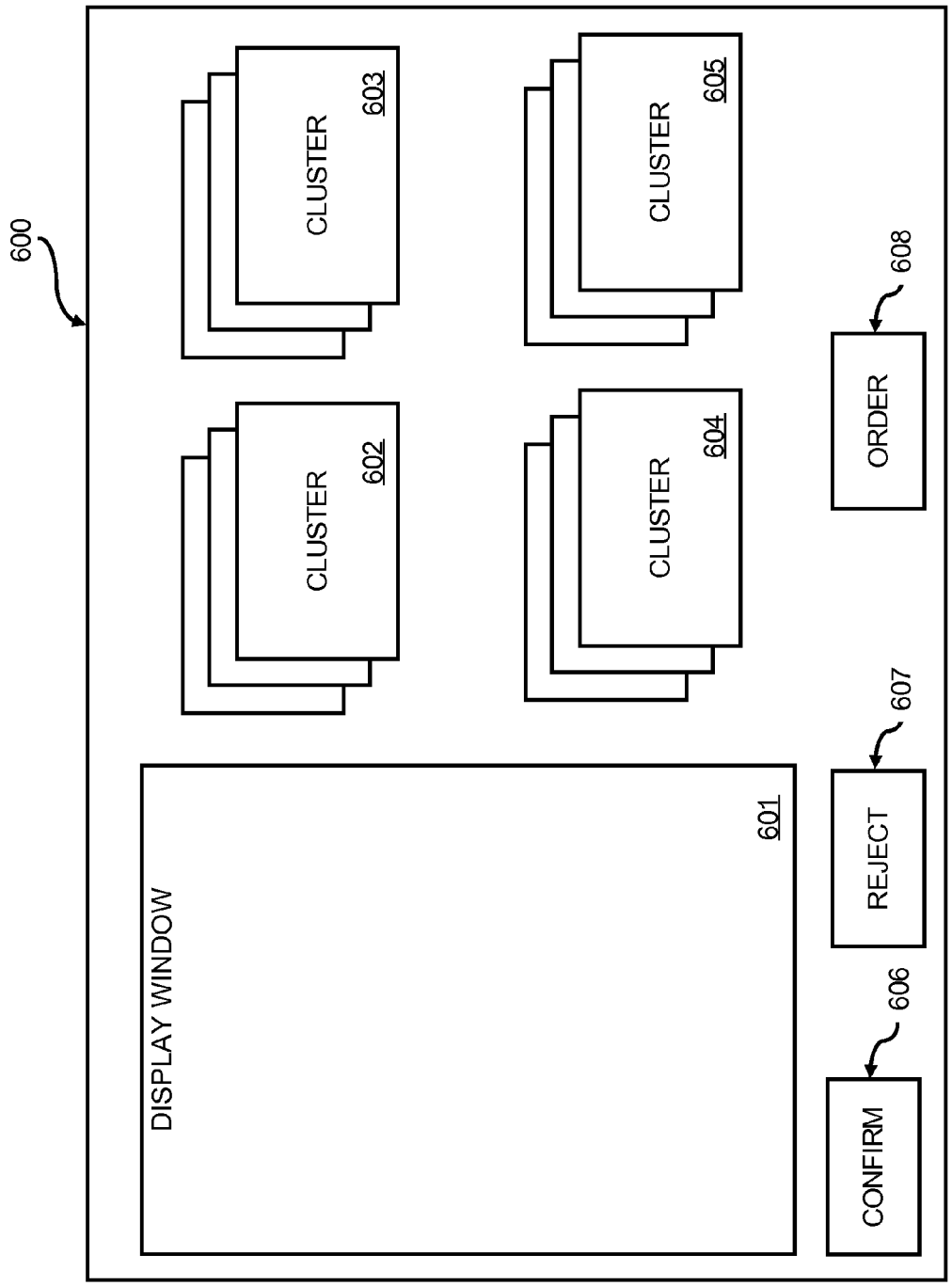
FIG. 6 is a schematic representation of a user interface for retrieving and confirming content according to an example.

FIG. 6 is a schematic representation of a user interface for retrieving and confirming content according to an example. On a display 600, a main selection window 601 displays content to a user for confirmation. For example, in the process of generating query data, an image or representative frame of the user can be displayed in window 601. If the user is happy that the image or frame provides a true or representative likeness, the user can confirm that the displayed image or frame is acceptable. There can be a dedicated button for confirming or rejecting an image, which can be a user-interface item if the display is a touch screen for example such as buttons 606, 607. Retrieved content can be displayed on display 600 in the form of content clusters 602-605. For example, a content cluster 602 can include a stack of images including retrieved content in which at least one person of a group associated with the person making the query appears. Other clusters 603-605 can similarly include clusters of content of the querying user and other members of a related group. Alternatively, there can be a single cluster which includes content of the querying user and any members of the group that user was with (including content in which the user does not appear, but which has been retrieved using co-appearance analysis).

Display 600 can further include provision to allow a user to buy copies of images, related products, or video. Accordingly, an order button 607 or similar can be provided which allows a user to enter a commerce interface in which various products and services can be displayed to the user and selected as desired. Typically, the user can buy goods which include retrieved images thereon, such as mugs, posters, calendars and so forth. Users can also purchase prints of images and copies of video. There can be provision to allow user to remotely store desired content or email such content to a desired email address. Remotely stored content can be later retrieved by a user or set of users for example.

Figure 7:
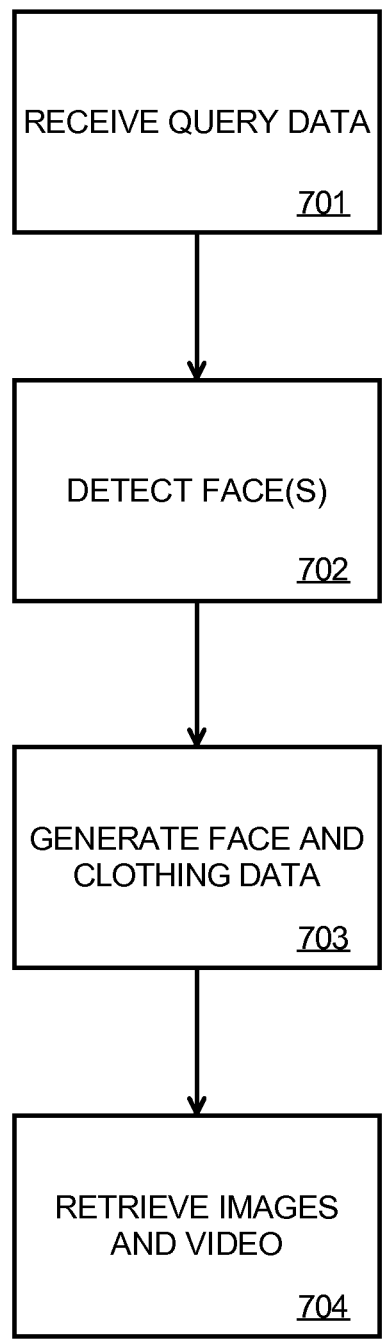
FIG. 7 is a flow chart of a method for retrieving content according to an example.

FIG. 7 is a flow chart for a method of retrieving content according to an example. At step 701, query data 107 is received into image retrieval system 105. Query data 107 includes an image of a person. At step 702 the face of the person in the image is detected to create a detected face. At step 703 face data and clothing data is generated using the detected face. The face data and clothing data include respective measures for the characteristics of the face and clothing of the person in the image. For example, the position of the nose, eyes and mouth can be used as a measure of the facial characteristics of the person. For clothing, a signature in the form of a histogram describing the colour distribution of the clothing can be used as a characteristic for the clothing of the person.

At step 704 images and video for the person and a related or associated group of people are retrieved. That is, images and video of the person making the query can be retrieved, or images and video of a group of people associated with that person can be retrieved. Such images for group members can be images in which the querying person appears or does not appear. Alternatively, images and video for the person and a related group in which all appear in combination can be retrieved. Retrieving includes comparing the face and clothing data of the person with multiple measures for the characteristics of faces and clothing generated from a set of images and video in which other people appear such that co-appearances of the person with at least some of the other people are used to retrieve content in which the person and people from the related group appear. For example, raw image data 103 captured using a network of image capture devices 101, 200 can be processed in order to determine the presence of people within certain ones of the images or portions of video. Faces can be detected, and regions of clothing determined. Corresponding measures for facial and clothing characteristics for people in the images and video portions can be generated and a comparison performed in order to detect the presence of the person in the image forming the query data. Non-trivial co-appearances of the person in the images and video portions are used in order to augment an initial cluster for the person with images and video in which the person appears with other people who form a group with the person. Co-appearances are also used to determine other images and portions of video in which such group members appear without the person making the query. That is to say, any images and video in which group members appear in isolation or otherwise with other people are retrieved and can form clusters for those group members. A complete cluster in which all images and video of the querying person and corresponding group members can also be generated.

Although examples have been described with reference to use in social settings, such as at theme parks etc, implementations can be employed which are suitable for use in the workplace or other work oriented settings. For example, at a conference, image capture devices can be positioned to allow the capture of images/video of delegates and/or speakers such that a record of the conference can be easily maintained.

What is claimed is:

1. A method, comprising:
receiving query data including an image of a person;
detecting a face of the person in the image to create a detected face;
generating face data and clothing data using the detected face, wherein the face data includes a measure of characteristics of the face and the clothing data includes a measure of characteristics of the clothing of the person;
using the face data and the clothing data of the person along with face data and clothing data of other people contained in at least one of images and videos to determine a subset of people who co-appear with the person at least a predetermined number of times or for a predetermined period of time, wherein the subset of people comprise a related group of people to the person; and
retrieving content in which the person co-appears with at least one person of the related group of people.

2. A method as claimed in claim 1, wherein receiving the query data includes receiving a representative image frame generated from a portion of video in which the person is visible.

3. A method as claimed in claim 1, wherein the images and videos further include data representing a corresponding time and location of capture, the method further including sorting the images and videos on the basis of capture time and capture location, and wherein retrieving the content further includes using the capture time and capture location to reduce a search space of images and videos to a reduced set of images and videos captured within a time period and location of interest.

4. A method as claimed in claim 1, wherein retrieving further includes retrieving content in which the at least one person of the related group of people co-appears with the person at least a predetermined number of times in images from a set of images, or for at least a predetermined period of time in a video.

5. An image retrieval system comprising:
at least one image capture device to generate image data representing a set of video and still images of a predetermined area; and
a memory storing machine readable instructions to:
generate representative image frames from the video;
detect people appearing in the representative frames and still images in the set, and create a set of detected faces for the detected people; and
generate face data and clothing data for the detected people including characteristics of the detected faces and clothing of the people;
receive query data including at least one image of a user;
detect a user face in the at least one image of the user;
generate user face data and clothing data including characteristics of the face and clothing of the user therefrom;
use the face data and clothing data of the detected people to determine a subset of people who co-appear with the user at least a predetermined number of times or for a predetermined period of time;
retrieve content from the set in which the user co-appears with at least one person of the related group of people;
a processor to execute the machine readable instructions.

6. An image retrieval system as claimed in claim 5, further including:
a display to:
present the retrieved content to the user for confirmation; and
on the basis of the confirmation, to provide the user with information for a plurality of selections on the display representing a set of products associated with the retrieved content.

7. An image retrieval system as claimed in claim 5, wherein the machine readable instructions are further to:
provide remote access to content including images and/or video for the user over a web-based service accessible by the user.

8. An image retrieval system as claimed in claim 5, wherein the machine readable instructions are further to:
restrict the retrieval of content using control query data.

9. A non-transitory computer-readable medium storing computer-readable program instructions that when executed by a computer are to:
provide query data including an image of a person;
detect a face of the person in the image to create a detected face;
generate face data and clothing data from the image using the detected face, wherein the face data includes a measure of characteristics of the face and the clothing data includes a measure of characteristics of the clothing of the person;
use the face data and the clothing data of the person along with face data and clothing data of other people contained in at least one of images and videos to determine a subset of people who co-appear with the person at least a predetermined number of times or for a predetermined period of time, wherein the subset of people comprise an associated group of people to the person; and
retrieve content in which the person co-appears with at least one person of the associated group of people.

10. A non-transitory computer-readable medium as claimed in claim 9, wherein the instructions are further to:
retrieve at least a portion of video including a plurality of image frames from the raw image data by determining the presence of the person in the frames by matching at least one of the face and clothing data of the person to a person identified in the frames.

11. A non-transitory computer-readable medium as claimed in claim 9, wherein the instructions are further to:
to retrieve at least one of an image and portion of video in which the person consistently co-appears with a first person; and
to retrieve at least one of an image and portion of video in which the first person consistently co-appears with a second person, wherein co-appearances between the first person and the second person are determined by using images and/or video in which the person co-appears with the second person.

12. A non-transitory computer-readable medium as claimed in claim 9, wherein the instructions are further to:
to receive control query data for controlling the retrieval by restricting access to raw image data including images and/or video of a given person.

13. An image and video content retrieval apparatus, comprising:
a memory storing computer-readable instructions; and
a processor coupled to the memory, to execute the instructions, and based at least in part on the execution of the instructions, to:
use face data and clothing data of a user along with face data and clothing data of other people contained in at least one of images and videos to determine a subset of people who co-appear with the user at least a predetermined number of times or for a predetermined period of time, wherein the subset of people comprise a related group of people to the user; and
retrieve content captured using a network of image capture devices disposed to image a predetermined area by using a measure of the characteristics of the face data and the clothing data of the user to determine content in which the user appears; and
retrieve content in which the user consistently appears with at least one person in the related group of people.

* * * * *